(12) United States Patent
Chun et al.

(10) Patent No.: US 8,644,839 B2
(45) Date of Patent: Feb. 4, 2014

(54) METHOD FOR CONTROLLING RADIO RESOURCE ALLOCATION IN MOBILE COMMUNICATION SYSTEM

(75) Inventors: Sung-Duck Chun, Gyeonggi-Do (KR); Young-Dae Lee, Gyeonggi-Do (KR); Sung-Jun Park, Gyeonggi-Do (KR); Seung-June Yi, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 265 days.

(21) Appl. No.: 12/450,655

(22) PCT Filed: Apr. 30, 2008

(86) PCT No.: PCT/KR2008/002461
§ 371 (c)(1),
(2), (4) Date: Oct. 5, 2009

(87) PCT Pub. No.: WO2008/133479
PCT Pub. Date: Nov. 6, 2008

(65) Prior Publication Data
US 2010/0105401 A1    Apr. 29, 2010

(30) Foreign Application Priority Data
Apr. 30, 2007    (KR) ........................ 10-2007-0041709

(51) Int. Cl.
*H04W 72/00*    (2009.01)
*H04M 3/00*    (2006.01)

(52) U.S. Cl.
USPC .......................................... 455/450; 455/418

(58) Field of Classification Search
USPC ........... 455/450, 522, 452.1, 411, 418, 452.2, 455/422.1, 509; 370/235, 338, 329, 252, 370/315
See application file for complete search history.

(56) References Cited

U.S. PATENT DOCUMENTS

| | | | | |
|---|---|---|---|---|
| 7,613,473 | B2 * | 11/2009 | Yi et al. | 455/518 |
| 7,957,739 | B2 * | 6/2011 | Jeong et al. | 455/436 |
| 2004/0242260 | A1 * | 12/2004 | Lescuyer | 455/525 |
| 2007/0149206 | A1 * | 6/2007 | Wang et al. | 455/450 |

FOREIGN PATENT DOCUMENTS

| KR | 10-2000-0014429 A | 3/2000 |
|---|---|---|
| KR | 2000-0014429 A | 3/2000 |

* cited by examiner

*Primary Examiner* — Michael Faragalla
(74) *Attorney, Agent, or Firm* — McKenna Long & Aldridge LLP

(57) ABSTRACT

In a wireless mobile communications system, a method for controlling a radio resource allocation is provided. A network transmits access control information to a terminal such that a request for the radio resource allocation which will be transmitted from the terminal can be controlled. The terminal selectively transmits the request for the radio resource allocation based on the received information, thus a transmission of an unnecessary request for the radio resource can be minimized, thereby preventing a waste of the radio resource.

9 Claims, 2 Drawing Sheets

METHOD FOR CONTROLLING RADIO RESOURCE ALLOCATION IN MOBILE COMMUNICATION SYSTEM

This application is a 371 national stage entry of International Application No. PCT/KR2008/002461, filed Apr. 30, 2008, and claims priority to Korean Patent Application No. 10-2007-0041709, filed Apr. 30, 2007, both of which are incorporated by reference herein in their entireties.

TECHNICAL FIELD

The present invention relates to a method for controlling a radio resource allocation in an E-UMTS (Evolved Universal Mobile Telecommunications System) and, more particularly, a network transmits access control information to a terminal such that a request for the radio resource allocation which will be transmitted from the terminal can be controlled, the terminal selectively transmits the request for the radio resource allocation based on the received information, as such a transmission of an unnecessary request for the radio resource can be minimized and the radio resources can be more effectively utilized.

BACKGROUND ART

FIG. 1 is a network structure of the E-UMTS, a mobile communication system applicable to the related art and the present disclosure.

The E-UMTS system has been evolved from the UMTS system, for which the 3GPP is proceeding with the preparation of the basic specifications applicable thereto. The E-UMTS system can be classified as an LTE (Long Term Evolution) system.

With reference to FIG. 1, the E-UMTS network is divided into an E-UTRAN and a CN (Core Network). The E-UTRAN includes a terminal (UE (User Equipment)), a base station (eNB or eNode B) and an AG (Access Gateway) (which also can be expressed as 'MME/S-GW'). The AG can be divided into a part for handling user traffic and a part for handling control traffic. The AG part for handling new user traffic and the AG part for handling control traffic can communicate with each other via newly defined interface. One or more cells may exist in a single eNode B (eNB), and an interface for transmitting the user traffic and the control traffic can be used between the eNode Bs.

The CN may include an AG, a node for user registration of the UE, and the like. Also, in the UMTS of FIG. 1, an interface for discriminating the E-UTRAN and the CN can be used. An S1 interface can connect a plurality of nodes (i.e., in a many-to-many manner) between the eNode B and the AG. The eNode Bs are connected with each other through an X2 interface, and the X2 interface is always present between adjacent eNode Bs in a meshed network structure.

Layers of a radio interface protocol between the UE and a network can be divided into a first layer (L1), a second layer (L2) and a third layer (L3) based upon the three lower layers of an open system interconnection (OSI) standard model that is well-known in the art of communication systems.

The first layer (L1) provides an information transfer service using a physical channel, and a radio resource control (RRC) layer positioned at the third layer (L3) serves to control radio resources between the terminal and the network, for which the RRC layer exchanges an RRC message between the terminal and the network. The RRC layer can be distributed so as to be positioned in network nodes such as the eNode Bs and the AGs, etc., or can be positioned only in the eNode Bs or in the AGs.

FIG. 2 illustrates a structure of the radio access interface protocol between the terminal and the UTRAN based upon various 3GPP wireless access network standards.

The radio access interface protocol has horizontal layers including a physical layer, a data link layer and a network layer, and has vertical planes including a user plane for transmitting data information and a control plane for transmitting control signals.

The protocol layers can be divided into a first layer (L1), a second layer (L2) and a third layer (L3) based upon the three lower layers of an open system interconnection (OSI) standard model that is well-known in the art of communication systems. Each layer of the control plane of the radio protocol in FIG. 2 and the user plane of the radio protocol in FIG. 3 will now be described.

The physical layer, the first layer, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the second layer provides a service to a radio link control (RLC) layer, an upper layer, via a logical channel. The RLC layer of the second layer reliably supports a data transmission. The function of the RLC layer can be implemented as a function block within the MAC layer, and in this case, the RLC layer may not be present. A PDCP layer of the second layer performs a header compression function for reducing unnecessary control information so that data transmitted by using IP packets such as IPv4 or IPv6 can be effectively transmitted via a radio interface with a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

Downlink transport channels for transmitting data from the network to the terminal, include a broadcast channel (BCH) for transmitting system information and a downlink shared channel (SCH) for transmitting the user traffic or the control message. Downlink multicast, traffic of a broadcast service or a control message can be transmitted through the downlink SCH or through a separate downlink multicast channel (MCH).

Uplink transport channels for transmitting data from the terminal to the network include a random access channel (RACH) for transmitting an initial control message and an uplink SCH for transmitting the user traffic and the control message.

A RRC connection and a signaling connection will be described in more detail as follows. In order to perform communications, a terminal (UE) needs to have a RRC connection with the UTRAN and a signaling connection with the Core Network (CN). The terminal transmits and/or receives a terminal's control information with the UTRAN or the CN via the RRC connection and the signaling connection.

In E-UMTS system, radio resource(s) of in a cell is allocated for an uplink radio resource(s) and a downlink radio resource(s). The base station (eNode B) is in charge of controlling or allocating of the uplink and downlink radio resource(s). Namely, the base station decides which terminal can use which or how much radio resource(s) for which particular time period(s). After such determination is made, the base station transmits those information to a corresponding terminal so that the terminal can perform the uplink or downlink transmission according to the information.

In conventional art, the terminal continuously uses the radio resource(s) in a connected mode. However, in recent years, there are many service based on an IP (Internet Protocol) packet, and continuously using of the radio resource(s) in the connected mode may cause a drawback because these IP packet based service does not always communicates packet (s) all the time, rather there are many periods that packets are not communicated even in the connected mode. As such, continuously allocating and using of the radio resource(s) for whole time period in a connected mode may be ineffective and undesirable.

In order to solve this drawback, the radio resource(s) may be allocated only when there is service data to be communicated. As such, to effectively utilize the radio resource, the base station must know a type of data each user wants to transmit or receive. In general, the base may possibly know an amount of data which will be transmitted in downlink, as the amount of downlink data is transferred from the access gateway. However, for an uplink data, if the terminal does not notify an amount of uplink data to the base station, the base station can not estimate a radio resource for transmitting the uplink data by the terminal. Accordingly, in order to allocate radio resource(s) in effective manner, the terminal needs to provide information related to radio resource scheduling to the base station. If the terminal has some data to be transmitted to the base station, the terminal should send some message or notification to the base station, then the base station provide a resource allocation message to the terminal based the radio resource scheduling information included in a radio resource allocation request message. Here, the base station checks a priority of the terminals and their data priority. After checking these priorities, the base station may determine the amount of radio resource(s) and transmit a radio resource allocation message to the terminal.

There are many terminals existing in a cell. Because of a limited radio resource(s) in the cell, the base station sometimes can not provide the radio resource(s) to all terminals that request the radio resource(s). When the radio resource(s) is not available or not enough within the cell, if the terminal transmits a radio resource allocation request message to the base station, such request message would not be necessary and this even causes a waste of uplink radio resource.

DISCLOSURE OF INVENTION

Technical Solution

The present invention has been developed in order to solve the above described problems of the related art. As a result, the present invention may provide a method for controlling a radio resource allocation in an improved or effective manner such that a waste of the radio resource can be minimized.

To implement at least the above feature in whole or in parts, the present invention may provide a method of receiving a radio resource allocation in a wireless communications system, the method comprising: receiving, from a network, information that controls a request for the radio resource allocation by a terminal; and determining whether or not to transmit the request for the radio resource allocation to the network based on the received information, wherein the information is received via at least one of system control information, a RRC message and a terminal dedicated message, the information is received with control information for a RACH (Random Access Channel) channel, and the information includes at least one of radio bearer information, call type information, service type information, priority information, time information and timer setting value.

The present invention may also provide a method of providing a radio resource allocation in a wireless communications system, the method comprising: transmitting access control information to a terminal, wherein the access control information is used to control a request for the radio resource allocation by the terminal; receiving the request of the radio resource allocation from the terminal when the terminal is allowed to transmit the request for the radio resource allocation based on the access control information; and transmitting the radio resource allocation to the terminal, wherein the access control information is transmitted through at least one of system control information, a RRC message and a terminal dedicated message, and the access control information includes at least one of radio bearer information, call type information, service type information, priority information, time information and timer setting value.

The present invention may also provide a method of allocating a radio resource in a wireless communications system, the method comprising: receiving a request for a radio resource allocation from a terminal; determining an available radio resource within one or more cells managed by a network; and transmitting a radio resource allocation reject message to the terminal when the radio resource is determined to be not enough for supporting a radio resource which will be used by the terminal, wherein the radio resource allocation reject message includes at least one of a radio resource allocation request timeout, priority information and a timer setting value.

The present invention may also provide a mobile terminal for receiving a radio resource allocation in a wireless communications system, the mobile terminal comprising: a radio protocol adapted to receive information for controlling a request for the radio resource allocation and to determine whether or not to transmit the request for the radio resource allocation to a network based on the received information.

Additional features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

MODE FOR THE INVENTION

One aspect of the present invention is the recognition by the present inventors regarding the problems and drawbacks of the related art described above and explained in more detail hereafter. Based upon such recognition, the features of the present invention have been developed.

Although the present invention is shown to be implemented in a mobile communication system, such as a UMTS and E-UMTS developed under 3GPP specifications, the present invention can also be applied to other communication systems operating in conformity with different standards and specifications.

Figure 1:
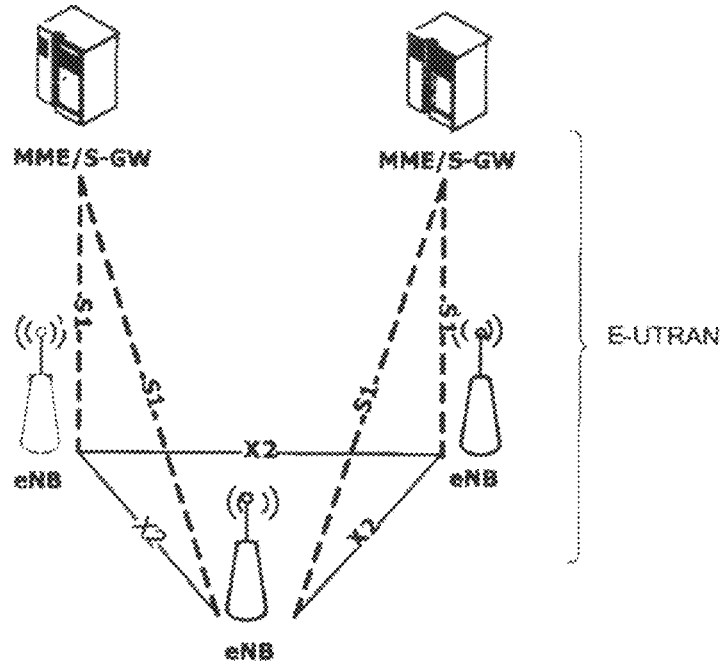
FIG. 1 shows an exemplary network structure of an E-UMTS, a mobile communication system for which a related art and the mobile terminal are applied.
Figure 2:
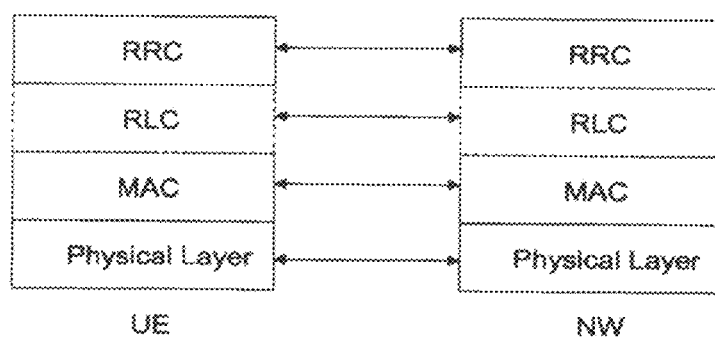
FIG. 2 is an exemplary structure of a control plane of a radio interface protocol between a terminal and a UTRAN based on a 3GPP wireless access network specification.
Figure 3:
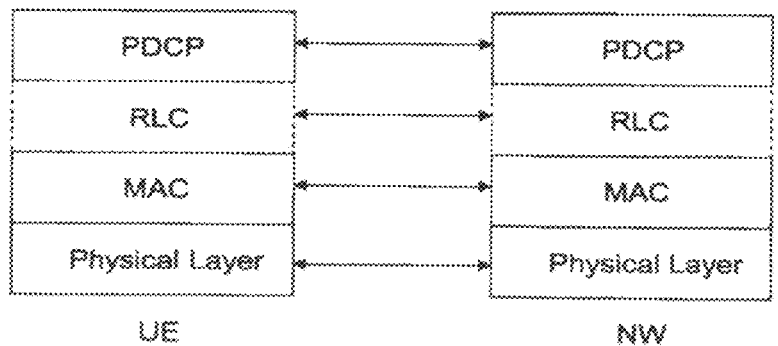
FIG. 3 is an exemplary structure of a user plane of the radio interface protocol between the terminal and the UTRAN based on the 3GPP wireless access network specification.
Figure 4:
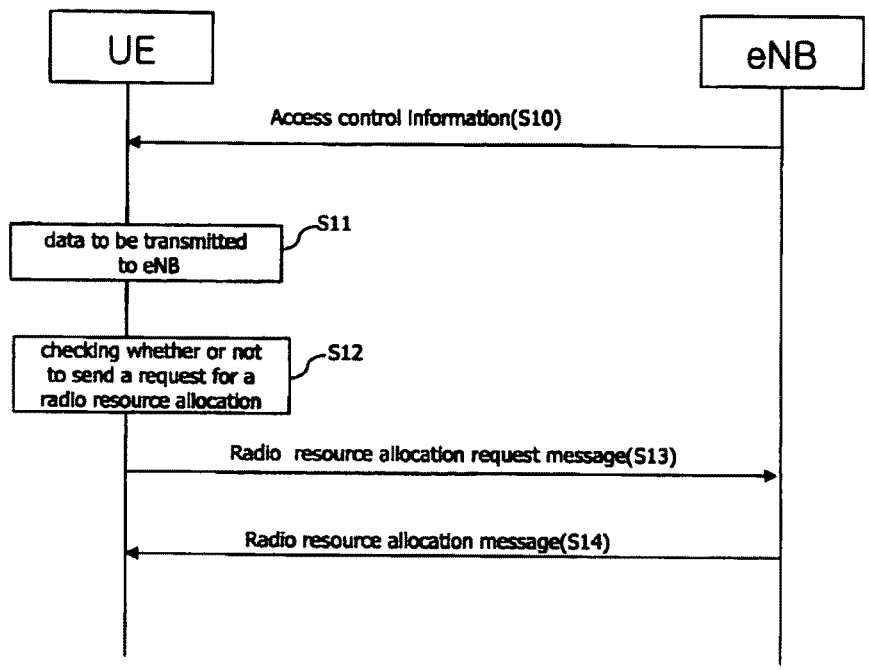
FIG. 4 shows an exemplary flow diagram for controlling a radio resource allocation in a mobile communications system according to a first embodiment of present invention.

FIG. 4 shows an exemplary flow diagram for controlling a radio resource allocation in a mobile communications system according to a first embodiment of present invention. As illustrated in FIG. 4, a network (UTRAN, Node B, eNB, etc) may transmit access control information to a terminal (i.e., UE) (S10) and the access control information may include information regarding that whether or not the terminal can transmit a radio resource allocation request message to the network in uplink direction. Here, the access control information may transmit through system information (SI), a RRC message, or a dedicated message to the UE respectively. Also, control information related with a RACH (random access channel) channel may be transmitted with the access control information, and the access control information may transmit via the RACH channel. Here, the access control information may also be handled or processed by a MAC (medium access control) layer or a RLC (radio link control) layer.

After receiving the access control information by the UE, if the UE has data that needs to be transmitted to the eNB (S11), the UE may check whether or not a transmission of a radio resource allocation request message has been allowed by the eNB according to the received access control information. (S12). After checking step, if it is allowed, the UE may transmit the radio resource allocation request message to the eNB (S13). Otherwise, the UE may not transmit the radio resource allocation request message to the eNB. After receiving the radio resource allocation request message by the eNB, the eNB may transmit the radio resource allocation message to the UE (S14), thereby allocating the radio source for transmitting an uplink data.

Here, if the eNB allows or restricts the radio resource allocation message without considering of a call type, a service type, a data type by the UE, this may cause another problem. For example, if there is a particular UE that starts to make an emergency call, an allocation of the radio resource for the particular UE should be performed or processed prior to all other UEs. Namely, any UE that needs to make the emergency call may be always allowed to transmit the radio resource allocation message. To do this, when the eNB transmit the access control information to the UE, the eNB may also notify or inform call type information, service type information, priority information, or radio bearer information for transmitting the radio resource allocation message.

For example, among a plurality of radio bearer set within the UE, the radio bearer information may include specific information that which radio bearer can be used to transmit the radio resource allocation request message. Specifically, the UE in an active state usually set with one or more radio bearers. The radio bearer information included in the access control information may inform the UE that a transmission of the radio resource allocation request message is allowed when data is received in which radio bearer. Therefore, when the UE receives data from an upper layer or entity, the UE checks which radio bearer being used to receive the data and determine whether or not the eNB allow to receive the radio resource allocation request message with respect to the radio bearer. After such determination, if it is allowed, the UE may transmit the radio resource allocation request message to the eNB, otherwise, the UE may not transmit the radio resource allocation request message to the eNB.

When the UE starts to make a certain type of call or receives data from an upper entity with respect to a certain type of call that is set within the UE, the call type information may inform or indicate the UE that the transmission of the radio resource allocation request message is allowed or not. When the UE starts to initiate a certain type of service or receive data from the upper entity with respect to a certain type of service that is set within the UE, the service type information may inform or indicate the UE that the transmission of the radio resource allocation request message is allowed or not.

For example, there are various types of call or service using by the UE such as a SMS (short message service), a voice call, or a video call, etc. Usually, the video call may require a large amount of the radio resource compared to the voice call. In this case, if there is a shortage of the radio resource in a cell, the eNB may allow to perform the voice call but may restrict to perform the video call, in order to provide call services for more users. This can be said that the radio resource allocation request message may be controlled by the eNB according to the types of call or service. By including the call type information or service type information in the access control information, the eNB may inform or notify the UE that the transmission of the radio resource allocation request message is allowed or not.

When the UE starts to make a certain type of call or receives data from an upper entity with respect to a certain type of call that is set within the UE, the UE may determine whether or not the transmission of the radio resource allocation request message is allowed or not by checking the received access control information. Then, if it is allowed, the UE may transmit the radio resource allocation request message, otherwise, the UE may not transmit the radio resource allocation request message. When the UE starts to initiate a certain type of service or receive data from the upper entity with respect to a certain type of service that is set within the UE, the service type information may inform or indicate the UE that the transmission of the radio resource allocation request message is allowed or not. In this case, the access control information may also inform the UE that what types of call or service can be provided by the eNB. Therefore, the UE may be able to identify the types of call or service that is supported by the eNB in a current cell, and the UE may perform a connection procedure to the current cell only if those supporting types of call or service are needed to be started.

When the UE has data to be transmitted to the eNB, the priority information may inform the UE that a priority level set with the data is enough to transmit the radio resource allocation request message or not. Usually, a plurality of radio bearer is set within the UE, and the eNB may inform the UE that the priority information for each radio bearer set within the UE. Because of this priority information, the UE may transmit data to the eNB in the order of priority of data.

For example, for data transmitting through a signaling bearer channel that is established to communicate messages for controlling the radio resource between the UE and eNB may need to be transmitted with a higher priority, comparing with the those voice data through a different channel. If the higher priority is not set with such data, the UE may become disconnected mode as the UE may fails to receive a radio resource setting properly. Therefore, the eNB may set those radio bearers that transmit the control message with a higher priority, and set those radio bearers that transit the voice data with a lower priority.

As such, when there is a shortage of the radio resource within one or more cells managed by a particular eNB, the particular eNB may provide a service based on a priority of data or radio bearer (i.e. in the order of priority of data), and may restrict the service for data or radio bearer having lower priority. By transmitting the access control information, the eNB may inform the UE whether or not the transmission of the radio resource allocation request message is allowed. Therefore, when the UE receives data on a particular radio bearer from an upper layer or entity, the UE checks the priority of the particular radio bearer and determine whether or not the eNB allow to receive the radio resource allocation request message with respect to the particular radio bearer. Here, the priority of the particular radio bearer may be compared to a parameter included in the access control information for such determination. After such determination, if it is allowed, the UE may transmit the radio resource allocation request message to the eNB, otherwise, the UE may not transmit the radio resource allocation request message to the eNB.

Specifically, the priority information may inform or notify each priority that is allowed to transmit the radio resource allocation request message, a lowest priority among a plurality of priorities that are allowed to transmit the radio resource allocation request message, or a highest priority among a plurality of priorities that are not allowed to transmit the radio resource allocation request message. Also, during a call setup, the eNB may inform to the UE a type of radio bearer which can not be applied by the access control information. For example, assuming that data of a particular signaling bearer must be transmitted all the time, in this case, the eNB may allow the UE to transmit the radio resource allocation request message anytime during the call setup whenever the UE receive the data of the particular signaling bearer.

In addition, the access control information may include the time information, and the time information may inform a certain time period that the UE is allowed to send the radio resource allocation request message. Namely, the UE may only transmit the radio resource allocation request message during the valid time period indicated by the time information. Or, the UE may transmit the radio resource allocation request message anytime before or after the certain time period.

Also, if the UE is not allowed to transmit the radio resource allocation request message by the access control information, the UE may activate a timer having a certain setting value, after the timer is expired, the UE may receive the access control information again. If the newly received access control information allows the UE to transmit the radio resource allocation request message, then the UE may transmit the radio resource allocation request message, otherwise the UE may re-activate the timer again. Here, the timer setting value may be transmitted from the eNB to the UE included in the access control information.

The eNB may inform the UE in case that previously transmitted access control information is changed. In such case, after such change is notified by the eNB, the UE may receive new access control information and may perform based on the new access control information.

Figure 5:
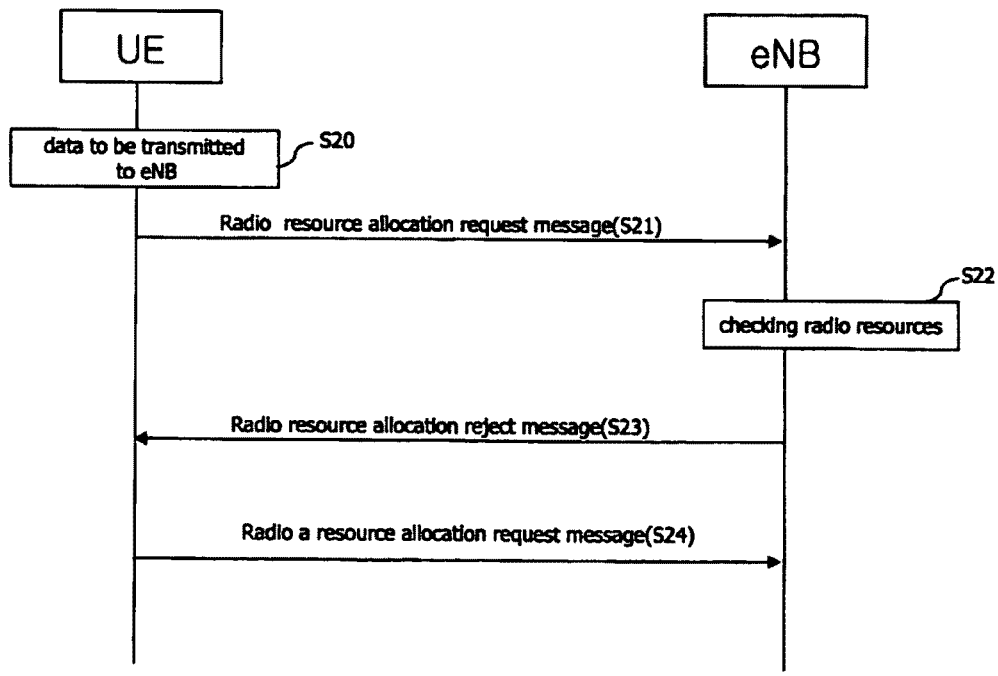
FIG. 5 shows an exemplary flow diagram for controlling a radio resource allocation in a mobile communications system according to a second embodiment of present invention.

FIG. 5 shows an exemplary flow diagram for controlling a radio resource allocation in a mobile communications system according to a second embodiment of present invention. As illustrated in FIG. 5, if the UE has data to be transmitted to the eNB, the UE may transmit a radio resource allocation request message to the eNB. (21) After transmitting the radio resource allocation request message by the UE, if the UE does not receive a radio resource allocation from the eNB within a certain time period, the UE may re-transmit the radio resource allocation request message assuming that the eNB did not properly receive the previously transmitted radio resource allocation request message.

Here, although the radio resource allocation request message is successfully received by the eNB, it may be possible that the eNB may not able to allocate a radio resource to the UE due to a shortage of available radio resources within a cell(s). In this case, the retransmission of the radio resource allocation request message by the UE may not be necessary and may further waste the radio resource within the cell(s). Therefore, after receiving the radio resource allocation request message, the eNB may check available or current radio resource(s) within the cell(s) (S22), then if there is the shortage of the radio resources within the cell(s) the eNB may transmit a radio resource allocation reject message to the UE (S23) thereby preventing the retransmission of the radio resource allocation request message by the UE.

Specifically, the eNB may transmit the radio resource allocation reject message if the radio resource can not be allocated to the UE after receiving the radio resource allocation request message from the UE. The UE may not transmit the radio resource allocation request message to the eNB again when the radio resource allocation reject message is received after transmitting of the radio resource allocation request message. However, after transmitting the radio resource allocation request message, the UE may retransmit the radio resource allocation request message if the UE did not receive a radio resource allocation within a certain time period while the radio resource allocation reject message has not been received. In addition, the eNB may transmit a timeout value for a radio resource request when the radio resource allocation rejection message is transmitted to the UE. The timeout value may indicate a specific time period that the UE can not possibly transmit the radio resource allocation request message to the eNB. Namely, if the UE receives the timeout value for the radio resource request as well as the radio resource allocation reject message, the UE may not transmit the radio resource allocation request message until the time period indicated by the received timeout value. After the timeout is over, the UE may retransmit the radio resource allocation request message to the eNB. (S24)

Also, the UE may start to initiate a timer having a predetermined time value when the radio resource allocation reject message is received from the eNB. After the timer is expired, the UE may retransmit the radio resource allocation request message to the eNB. Preferably, the predetermined time value for the timer may be received with the radio resource allocation reject message or through system information. Furthermore, priority information may also be transmitted to the UE when the UE receives the radio resource allocation reject message. The priority information may include specific information for the UE to transmit or not to transmit the radio resource allocation request message depending upon a priority level of data. Therefore, if the priority level of data is higher enough to transmit the radio resource allocation request message based upon the priority information, the UE may then transmit the radio resource allocation request message.

Namely, the present invention provides effective way of controlling a radio resource allocation such that a waste of the radio resource can be minimized. According to the present invention, the eNB may transmit access control information to UE in order to control a radio resource allocation request message. Using the access control information, a transmission of an unnecessary request for the radio resource can be minimized and the radio resources can be more effectively utilized. Also, according to the present invention, the eNB checks radio resources within one or more cells, and then the eNB transmits a radio resource allocation reject message if there are not enough radio resources. By transmitting the radio resource allocation reject message, a transmission of an unnecessary request for the radio resource can be also minimized and the radio resources can be more effectively utilized as well.

It can be said that the present invention may provide a method of receiving a radio resource allocation in a wireless communications system, the method comprising: receiving, from a network, information that controls a request for the radio resource allocation by a terminal; and determining whether or not to transmit the request for the radio resource allocation to the network based on the received information, wherein the information is received via at least one of system control information, a RRC message and a terminal dedicated message, the information is received with control information for a RACH (Random Access Channel) channel, the information includes at least one of radio bearer information, call type information, service type information, priority information, time information and timer setting value.

The present invention may provide a method of providing a radio resource allocation in a wireless communications system, the method comprising: transmitting access control information to a terminal, wherein the access control information is used to control a request for the radio resource allocation by the terminal; receiving the request of the radio resource allocation from the terminal when the terminal is allowed to transmit the request for the radio resource allocation based on the access control information; and transmitting the radio resource allocation to the terminal, wherein the access control information is transmitted through at least one of system control information, a RRC message and a terminal dedicated message, the access control information includes at least one of radio bearer information, call type information, service type information, priority information, time information and timer setting value, the request for radio resource allocation is transmitted to the network using a specific radio bearer indicated by the radio bearer information, the request for radio resource allocation is transmitted to the network when at least one of the call type information and the service type information allows the terminal to transmit the request for radio resource allocation, the request for radio resource allocation is transmitted to the network when a priority level of uplink data is higher than a reference level indicated by the priority information, the request for radio resource allocation is transmitted to the network in an order of a priority level of uplink data indicated by the priority information, and the request for radio resource allocation is transmitted to the network during a certain time period indicated by the time information.

The present invention may also provide a method of allocating a radio resource in a wireless communications system, the method comprising: receiving a request for a radio resource allocation from a terminal; determining an available radio resource within one or more cells managed by a network; and transmitting a radio resource allocation reject message to the terminal when the radio resource is determined to be not enough for supporting a radio resource which will be used by the terminal, wherein the radio resource allocation reject message includes at least one of a radio resource allocation request timeout, priority information and a timer setting value.

Also, it can be said that the present invention may provide a mobile terminal for receiving a radio resource allocation in a wireless communications system, the mobile terminal comprising: a radio protocol adapted to receive information for controlling a request for the radio resource allocation and to determine whether or not to transmit the request for the radio resource allocation to a network based on the received information.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of receiving a radio resource allocation in a wireless communications system, the method comprising:
   receiving, from a network, information that controls a request for the radio resource allocation by a terminal that is in a Radio Resource Control (RRC) connected state,
   wherein the information is received via an RRC message, and
   wherein the information includes at least one of radio bearer information, call type information, and service type information; and
   determining whether or not to transmit the request for the radio resource allocation to the network based on the received information.

2. The method of claim 1, wherein the information is received with control information for a RACH (Random Access Channel) channel.

3. The method of claim 1, wherein the request for radio resource allocation is transmitted to the network using a specific radio bearer indicated by the radio bearer information.

4. The method of claim 1, wherein the request for radio resource allocation is transmitted to the network when at least one of the call type information and the service type information allows the terminal to transmit the request for radio resource allocation.

5. The method of claim 1, wherein the request for radio resource allocation is transmitted to the network when a priority level of uplink data is higher than a reference level indicated by the priority information.

6. The method of claim 1, wherein the request for radio resource allocation is transmitted to the network in an order of a priority level of uplink data indicated by the priority information.

7. The method of claim 1, wherein the request for radio resource allocation is transmitted to the network during a certain time period indicated by the time information.

8. A method of providing a radio resource allocation in a wireless communications system, the method comprising:
   transmitting access control information to a terminal that is in a Radio Resource Control (RRC) connected state, wherein the access control information is used to control a request for the radio resource allocation which will be transmitted from the terminal,
   wherein the access control information is transmitted through an RRC message, and
   wherein the access control information includes at least one of radio bearer information, call type information, and service type information;
   receiving the request of the radio resource allocation from the terminal when the terminal is allowed to transmit the request for the radio resource allocation based on the access control information; and
   transmitting the radio resource allocation to the terminal.

9. A mobile terminal for receiving a radio resource allocation in a wireless communications system, the mobile terminal comprising:
   a radio protocol adapted to receive information for controlling a request for the radio resource allocation and to determine whether or not to transmit the request for the radio resource allocation to a network based on the received information, wherein the terminal is in a Radio Resource Control (RRC) connected state, wherein the information is received via an RRC message, and wherein the information includes at least one of radio bearer information, call type information, and service type information.

* * * * *